(12) United States Patent
Rao

(10) Patent No.: US 11,010,879 B2
(45) Date of Patent: May 18, 2021

(54) VIDEO IMAGE PROCESSING METHOD AND APPARATUS THEREOF, DISPLAY DEVICE, COMPUTER READABLE STORAGE MEDIUM AND COMPUTER PROGRAM PRODUCT

(71) Applicant: BOE TECHNOLOGY GROUP CO., LTD., Beijing (CN)

(72) Inventor: Tianmin Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 99 days.

(21) Appl. No.: 16/419,115

(22) Filed: May 22, 2019

(65) Prior Publication Data
US 2020/0134793 A1    Apr. 30, 2020

(30) Foreign Application Priority Data

Oct. 30, 2018    (CN) .......................... 201811284369.4

(51) Int. Cl.
*G06K 9/00*    (2006.01)
*G06T 5/00*    (2006.01)
(Continued)

(52) U.S. Cl.
CPC ................ *G06T 5/009* (2013.01); *G06T 5/50* (2013.01); *H04N 9/3182* (2013.01); *H04N 9/77* (2013.01)

(58) Field of Classification Search
None
See application file for complete search history.

(56) References Cited

U.S. PATENT DOCUMENTS 8,063,873 B2 * 11/2011 Chen .................... G09G 3/3406
                                                          345/102
8,212,843 B2 *  7/2012 Barnhoefer .......... G09G 3/3406
                                                          345/690
(Continued)

FOREIGN PATENT DOCUMENTS

CN        101051443 A      10/2007
CN        101340511 A       1/2009

OTHER PUBLICATIONS

First Office Action for Chinese Patent Application No. 201811284369A dated Jul. 29, 2019.
(Continued)

*Primary Examiner* — Shervin K Nakhjavan
(74) *Attorney, Agent, or Firm* — Calfee, Halter & Griswold LLP

(57) ABSTRACT

Embodiments of the disclosure provide a video image processing method and apparatus thereof, and a display device, relate to the field of image processing technology, and in particular, and can solve the problem in the existing video image processing methods that real-time processing of a video image cannot be achieved due to large computational complexity. The video image includes multiple frames of image, and the method includes: obtaining a brightness characterization parameter representing image brightness for a current frame of image; obtaining a ratio of a brightness value of each input pixel in the current frame of image to the brightness characterization parameter; and obtaining a product of the ratio and a numerical value (M+1), wherein M is a maximum possible pixel brightness value of the current frame of image, and taking the product as a brightness value of an output pixel of the current frame of image. The invention can achieve contrast enhancement of a video image.

20 Claims, 4 Drawing Sheets

(51) Int. Cl.
  *G06T 5/50*    (2006.01)
  *H04N 9/31*   (2006.01)
  *H04N 9/77*   (2006.01)

(56) References Cited

U.S. PATENT DOCUMENTS

| | | | |
|---|---|---|---|
| 2006/0018537 A1* | 1/2006 | Wu | H04N 19/86 |
| | | | 382/168 |
| 2008/0118179 A1* | 5/2008 | Jeong | G06T 5/002 |
| | | | 382/275 |
| 2009/0135195 A1* | 5/2009 | Chen | G09G 3/3426 |
| | | | 345/589 |
| 2009/0315977 A1* | 12/2009 | Jung | G06T 5/009 |
| | | | 348/42 |
| 2011/0206280 A1* | 8/2011 | Lee | G06T 5/40 |
| | | | 382/167 |
| 2015/0016722 A1* | 1/2015 | Onda | H04N 1/6027 |
| | | | 382/167 |
| 2017/0256037 A1* | 9/2017 | Li | G06T 5/002 |
| 2018/0120642 A1* | 5/2018 | Zhang | G02F 1/133611 |
| 2019/0020805 A1* | 1/2019 | Trieu | G06T 5/50 |
| 2019/0311468 A1* | 10/2019 | Qian | H04N 5/2351 |

OTHER PUBLICATIONS

Second Office Action for Chinese Patent Application No. 201811284369.4 dated Feb. 21, 2020.

\* cited by examiner

VIDEO IMAGE PROCESSING METHOD AND APPARATUS THEREOF, DISPLAY DEVICE, COMPUTER READABLE STORAGE MEDIUM AND COMPUTER PROGRAM PRODUCT

CROSS REFERENCE TO RELATED APPLICATIONS

This application claims the benefits of the Chinese patent application No. 201811284369.4 filed on Oct. 30, 2018, the entire disclosure of which is incorporated herein by reference.

TECHNICAL FIELD

The disclosure relates to the field of image processing technology, and in particular, to a video image processing method and apparatus thereof, a display device, a computer readable storage medium and a computer program product.

BACKGROUND

For an 8k display system, various manufacturers are committed to providing differentiated visual display effects in addition to its own high resolution. As a common image enhancement function, contrast enhancement may improve the display effect of a dark video.

In a reference example, there are multiple approaches for contrast enhancement. As one of them, the Retinex algorithm has received wide attention since it has a good enhancement effect. In the Retinex algorithm, an image may be considered to be composed of an incident image and a reflected image, the incident light is reflected by an object to form reflected light to enter human eyes. It forms an image as shown by the following formula, $$r(x, y) = \log R(x, y) = \log \frac{S(x, y)}{L(x, y)}$$

wherein R(x, y) is a reflected image representing the reflective property of the object, L(x, y) is a brightness image representing the dynamic range that an image pixel can achieve, S(x, y) is an original image, and the contrast enhancement algorithm modifies the image output by changing L(x, y), to achieve the purpose of image contrast enhancement.

For a hardware system, although the algorithm based on Retinex has a good realization potential, since logarithmic operation is needed in this algorithm, this results in large computational complexity when processing a video image, and especially for 8 K pictures, complex operation causes the processing speed to be greatly reduced, and thereby real-time processing of the 8 K pictures cannot be carried out.

SUMMARY

According to an aspect of the disclosure, there is provided a video image processing method, the video image including multiple frames of image, the method including: obtaining a brightness characterization parameter representing image brightness for a current frame of image; obtaining a ratio of a brightness value of each input pixel in the current frame of image to the brightness characterization parameter; and obtaining a product of the ratio and a numerical value (M+1), wherein M is a maximum possible pixel brightness value of the current frame of image, and taking the product as a brightness value of an output pixel of the current frame of image.

According to an embodiment, the brightness characterization parameter is the maximum of brightness values of all input pixels in the current frame of image.

According to an embodiment, the brightness characterization parameter is the maximum of brightness values of all input pixels in a previous frame of image.

According to an embodiment, in response to the maximum of brightness values of all input pixels in a previous frame of image being less than the numerical value 128, the brightness characterization parameter is difference between the numerical value 255 and the maximum; in response to the maximum of the brightness values of all input pixels in the previous frame of image being greater than the numerical value 250, the brightness characterization parameter is difference between the maximum and the numerical value 5; and in response to the maximum of the brightness values of all input pixels in the previous frame of image being greater than or equal to the numerical value 128 and less than or equal to the numerical value 250, the brightness characterization parameter is the maximum; wherein the M value is 255.

According to an embodiment, in response to the maximum of brightness values of all input pixels in the current frame of image being less than the numerical value 128, the brightness characterization parameter is determined as difference between the numerical value 255 and the maximum; in response to the maximum of the brightness values of all input pixels in the current frame of image being greater than the numerical value 250, the brightness characterization parameter is determined as difference between the maximum and the numerical value 5; and in response to the maximum of the brightness values of all input pixels in the current frame of image being greater than or equal to the numerical value 128 and less than or equal to the numerical value 250, the brightness characterization parameter is determined as the maximum; wherein the M value is 255.

According to an embodiment, before the obtaining the brightness characterization parameter for the current frame of image, the method further includes detecting whether an asynchronous processing signal is received; and if the asynchronous processing signal is received, the obtaining the brightness characterization parameter for the current frame of image is particularly to obtain the brightness characterization parameter for a previous frame of image as the brightness characterization parameter for the current frame of image.

According to an embodiment, the obtaining the ratio of the brightness value of each input pixel in the current frame of image to the brightness characterization parameter is particularly to adopt a fixed point approach to obtain the ratio of the brightness value of each input pixel in the current frame of image to the brightness characterization parameter.

According to an embodiment, the video image is a YUV format image.

According to an embodiment, the M value is 15, or the M value is 255, or the M value is 1023.

According to another aspect of the disclosure, there is provided a video image processing apparatus including: a first obtainer configured for obtaining a brightness characterization parameter representing image brightness for a current frame of image; a second obtainer configured for obtaining a ratio of a brightness value of each input pixel in the current frame of image to the brightness characterization parameter; and a third obtainer configured for obtaining a product of the ratio and a numerical value (M+1), wherein M is a maximum possible pixel brightness value of the current frame of image, and taking the product as a brightness value of an output pixel of the current frame of image.

According to an embodiment, the first obtainer is further configured to take the maximum of brightness values of all input pixels in the current frame of image as the brightness characterization parameter.

According to an embodiment, the first obtainer is further configured to take the maximum of brightness values of all input pixels in a previous frame of image as the brightness characterization parameter.

According to an embodiment, the first obtainer is further configured to determine the brightness characterization parameter in a way in which in response to the maximum of brightness values of all input pixels in a previous frame of image being less than the numerical value 128, the brightness characterization parameter is difference between the numerical value 255 and the maximum; in response to the maximum of the brightness values of all input pixels in the previous frame of image being greater than the numerical value 250, the brightness characterization parameter is difference between the maximum and the numerical value 5; and in response to the maximum of the brightness values of all input pixels in the previous frame of image being greater than or equal to the numerical value 128 and less than or equal to the numerical value 250, the brightness characterization parameter is the maximum; wherein the M value is 255.

According to an embodiment, the first obtainer is further configured to determine the brightness characterization parameter in a way in which in response to the maximum of brightness values of all input pixels in the current frame of image being less than the numerical value 128, the brightness characterization parameter is determined as difference between the numerical value 255 and the maximum; in response to the maximum of the brightness values of all input pixels in the current frame of image being greater than the numerical value 250, the brightness characterization parameter is determined as difference between the maximum and the numerical value 5; and in response to the maximum of the brightness values of all input pixels in the current frame of image being greater than or equal to the numerical value 128 and less than or equal to the numerical value 250, the brightness characterization parameter is determined as the maximum; wherein the M value is 255.

According to an embodiment, the first obtainer is further configured to detect whether an asynchronous processing signal is received; and if the asynchronous processing signal is received, the obtaining the brightness characterization parameter for the current frame of image is particularly to obtain the brightness characterization parameter for a previous frame of image as the brightness characterization parameter for the current frame of image.

According to an embodiment, the second obtainer is further configured to adopt a fixed point approach to obtain the ratio of the brightness value of each input pixel in the current frame of image to the brightness characterization parameter.

According to an embodiment, the video image is a YUV format image.

According to an embodiment, the M value is 15, or the M value is 255, or the M value is 1023.

According to still another aspect of the disclosure, there is provided a computer readable storage medium storing computer executable instructions thereon, which cause a computing device to implement the method of the one aspect of the disclosure or any embodiment thereof when executed by the computing device.

According to yet still another aspect of the disclosure, there is provided a computer program product including computer executable instructions, which cause a computing device to implement the method of the one aspect of the disclosure or any embodiment thereof when executed by the computing device.

BRIEF DESCRIPTION OF THE DRAWINGS

In order to more clearly illustrate the technical solutions in embodiments or reference examples of the disclosure, the appended drawings needing to be used in the description of the embodiments or the reference examples will be introduced briefly in the following. Obviously, the drawings in the following description are only some embodiments of the disclosure, and for a person having ordinary skills in the art, other drawings may also be obtained according to these drawings under the premise of not paying out undue experimentation.

DETAILED DESCRIPTION

In the following the technical solutions in embodiments of the disclosure will be described clearly and completely in connection with the drawings in the embodiments of the disclosure. Obviously, the described embodiments are just a part of the embodiments of the disclosure, and not all the embodiments. Based on the embodiments in the disclosure, all the other embodiments obtained by a person having ordinary skills in the art under the premise of not paying out undue experimentation pertain to the scope protected by the invention.

Figure 1:
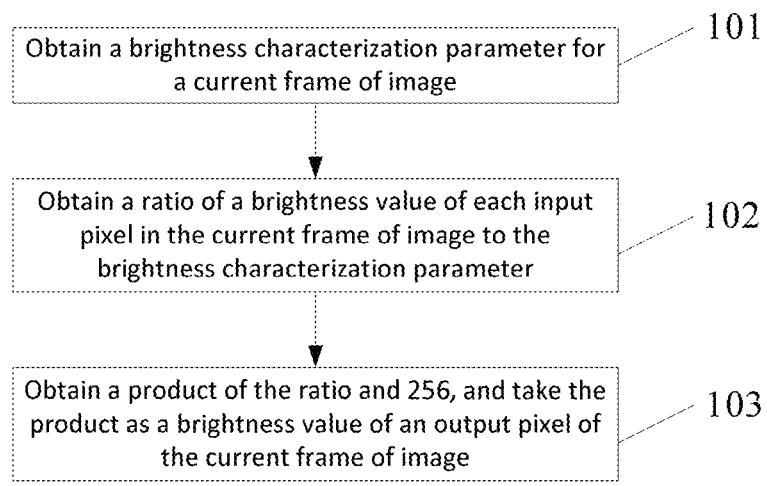
FIG. 1 is a flow chart of a video image processing method provided by an embodiment of the disclosure.

An aspect of the disclosure provides a video image processing method, the video image including multiple frames of image, and as shown in FIG. 1, the method including the following steps.

At step 101, a brightness characterization parameter for a current frame of image is obtained.

Therein, the video image may be a video image at a resolution of 4 K, a video image at a resolution of 8 K, a video image at a resolution of 10 K, or a video image at another resolution, which will not be limited by embodiments of the disclosure.

The current frame of image is a frame of image that needs to be processed or is being processed currently, and which is any one frame of image in the multiple frames of image contained in the video image.

The brightness characterization parameter is determined as a parameter which can characterize the brightness of all input pixels in the current frame of image. The brightness characterization parameter may take many forms. Exemplarily, the brightness characterization parameter may be the maximum of the brightness values of all input pixels in the current frame of image, or also may be the maximum of the brightness values of all input pixels in the previous frame of image of the current frame of image, or the like, which will not be limited by embodiments of the disclosure.

At step 102, the ratio of the brightness value of each input pixel in the current frame of image to the brightness characterization parameter is obtained.

In an example, the brightness value of an enhanced pixel is p(x, y)=S(x, y)/Lmax, wherein S(x, y) is the brightness value of the input pixel, and Lmax is the brightness characterization parameter. It can be seen from the formula that as compared to the reference example, the processing of each input pixel in the embodiment of the disclosure is simplified as a simple division operation, thus reducing the computational complexity of the algorithm and greatly increasing the processing speed of the video image.

At step 103, the product of the ratio and a numerical value (M+1) is obtained, wherein M is a maximum possible pixel brightness value of the current frame of image, and the product is taken as the brightness value of an output pixel of the current frame of image.

In an example, the brightness value of an output pixel is P(x, y)=(M+1)*p(x, y), in which after the ratio of the brightness value of each input pixel in the current frame of image to the brightness characterization parameter is obtained, multiplication of the ratio with the numerical value (M+1) may achieve the purpose of restoration with the current pixel grayscale.

It needs to be noted that in an actual application, step 102 and step 103 may be performed simultaneously, that is, each time the ratio of the brightness value of an input pixel to the brightness characterization parameter is calculated, the ratio is multiplied with the numerical value (M+1) immediately; it may also be such that step 102 is performed first, and then step 103 is performed, that is, the ratio of the brightness value of each input pixel to the brightness characterization parameter is calculated to get all the ratios, and then each of the ratios is multiplied with the numerical value (M+1). This will not be limited by embodiments of the disclosure.

As such, as compared with the reference example, by amending the existing Retinex algorithm formula to remove the logarithmic operation, the video image processing method provided by the embodiment of the disclosure simplifies the processing of the inputted video image as obtaining the ratio of each input pixel to the brightness characterization parameter, which simplifies the computational complexity of the Retinex algorithm, increases the processing speed of the video image, and makes real-time processing of the existing video image, especially the 8 K video image possible.

For a 4 K video image, the M value is 15; for an 8 K video image, the M value is 256; and for a 10 K video image, the M value is 1023.

In some embodiments of the disclosure, the brightness characterization parameter is determined as the maximum of the brightness values of all input pixels in the current frame of image. In such a way, it is necessary for a processor to scan the current frame of image twice, wherein the first scan obtains the maximum of the brightness values of all input pixels in the current frame of image as the brightness characterization parameter, and the second scan utilizes the brightness characterization parameter to perform enhancement algorithm operations on the current frame of image. The two scans not only need long processing time, making it difficult to implement real-time processing, in such a way, an additional DDR (Double Data Rate) memory is further needed to cache the current frame of image, which further reduces the processing performance.

To reduce the processing delay caused by the two scans, in some other embodiments of the disclosure, the brightness characterization parameter is determined as the maximum of the brightness values of all input pixels in a previous frame of image. In such a way, the brightness characterization parameter with which the processor performs the enhancement algorithm operations on the current frame of image is the maximum of the brightness values of all input pixels in the previous frame of image, and thus the processor may accomplish both the enhancement algorithm operations of the current frame of image and detection of the maximum of the brightness values of all input pixels in the current frame of image in one scan, and then take the detected maximum as an updated brightness characterization parameter to be passed to a next frame of image for performing the enhancement algorithm operations on the next frame of image, and by analogy, the contrast enhancement algorithm operations of all the images are completed. Since this scheme adopts an inter-frame parameter for image processing, and avoids using a cache to wait for the second scan of the current frame of image, and the parameter of the current frame of image is directly applied to a new incoming next frame of image, this increases the processing speed.

To avoid too large difference between frames and cause the processing of each frame to be performed in a relatively smooth trend, preferably, it may be possible to map the maximum of the brightness values of all input pixels in the previous frame of image. In an example, for an 8 K video image for example, when the maximum of the brightness values of all input pixels in the previous frame of image is less than the numerical value 128, the brightness characterization parameter is determined as the difference between the numerical value 255 and the maximum; when the maximum of the brightness values of all input pixels in the previous frame of image is greater than the numerical value 250, the brightness characterization parameter is determined as the difference between the maximum and the numerical value 5; and when the maximum of the brightness values of all input pixels in the previous frame of image is greater than or equal to the numerical value 128 and less than or equal to the numerical value 250, the brightness characterization parameter is determined as the maximum. Refer to the following formula:

$$L_{max} = \begin{cases} 255 - l_{max} & l_{max} < 128 \\ l_{max} - 5 & l_{max} > 250 \\ l_{max} & \text{else} \end{cases}$$

wherein lmax is the maximum of the brightness values of all input pixels in the previous frame of image, and Lmax is the brightness characterization parameter.

Likewise, if the processing delay caused by the two scans is not considered, in another example, still for an 8 K video image, it may be possible to map the maximum of the brightness values of all input pixels in the current frame of image. In particular, when the maximum of the brightness values of all input pixels in the current frame of image is less than the numerical value 128, the brightness characterization parameter is determined as the difference between the numerical value 255 and the maximum; when the maximum of the brightness values of all input pixels in the current frame of image is greater than the numerical value 250, the brightness characterization parameter is determined as the difference between the maximum and the numerical value 5; and when the maximum of the brightness values of all input pixels in the current frame of image is greater than or equal to the numerical value 128 and less than or equal to the numerical value 250, the brightness characterization parameter is determined as the maximum. Refer to the following formula:

$$L_{max} = \begin{cases} 255 - l_{max} & l_{max} < 128 \\ l_{max} - 5 & l_{max} > 250 \\ l_{max} & \text{else} \end{cases}$$

wherein lmax is the maximum of the brightness values of all input pixels in the current frame of image, and Lmax is the brightness characterization parameter.

Figure 2:
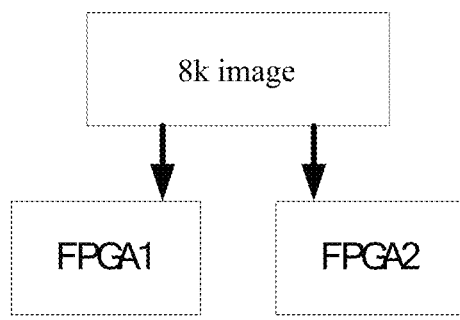
FIG. 2 is a first schematic diagram of 8 K image processing provided by an embodiment of the disclosure.

When carrying out an 8k or 4k product development project, different from a conventional development platform, the 8k project generally employs a scheme in which multiple FPGAs (Field Programmable Gate Arrays) work in cooperation. When processing an 8k image, two FPGAs are responsible for processing left and right pictures, respectively, as shown in FIG. 2.

In this condition, when using the inter-frame parameter to process an 8k image, it is necessary to consider cooperative work of left and right pictures. For a processing platform, it is needed to optimize the cooperative processing of FPGA1 and FPGA2. Between the two FPGAs, not only a relevant parameter (namely, the brightness characterization parameter) needs to be transferred, but also mutual confirmation of picture synchronization and a protective mechanism when asynchronization takes place is needed.

Therefore, before the obtaining a brightness characterization parameter for a current frame of image, the method further includes detecting whether an asynchronous processing signal is received; and if the asynchronous processing signal is received, the obtaining a brightness characterization parameter for a current frame of image is particularly to obtain a brightness characterization parameter for a previous frame of image as the brightness characterization parameter for the current frame of image.

Figure 3:
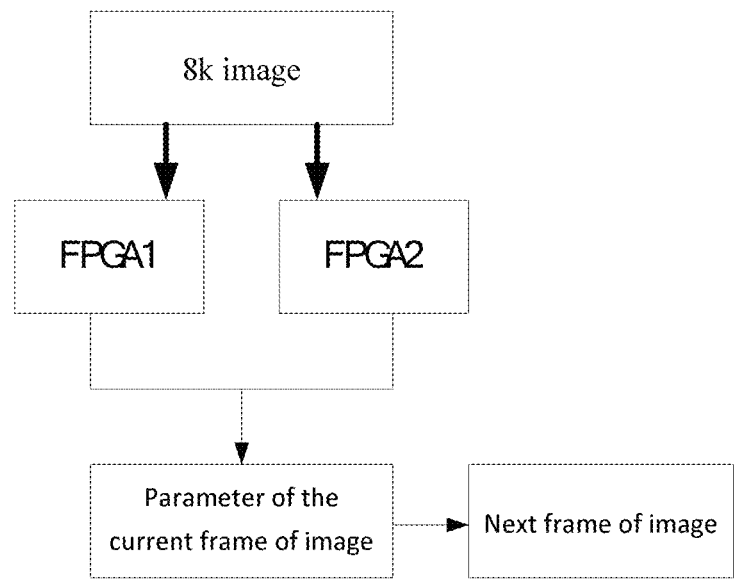
FIG. 3 is a second schematic diagram of 8 K image processing provided by an embodiment of the disclosure.

In an example, when the picture synchronization is normal, both FPGA1 and FPGA2 guarantee that what is processed is the same one frame of 8k picture, and therefore, in the current frame, it is only needed to output the parameter (i.e., the maximum of the brightness values of all input pixels in the current frame of image) obtained by the both, and transfer it to a next frame of image, as shown in FIG. 3.

Figure 4:
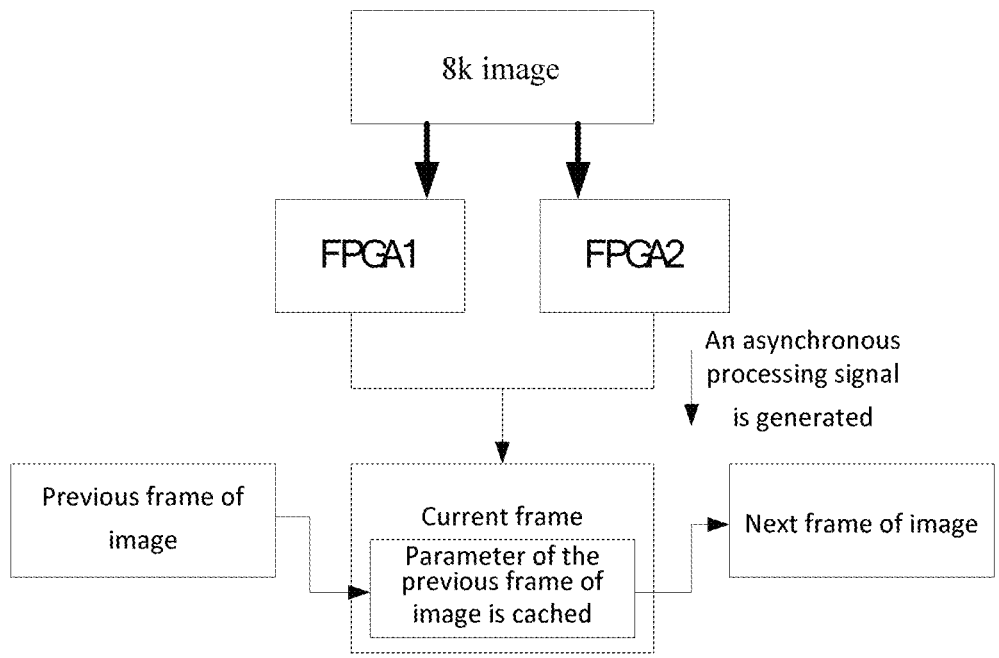
FIG. 4 is a third schematic diagram of 8 K image processing provided by an embodiment of the disclosure.

When asynchronization occurs, it is needed to perform burst processing operations. When an asynchronous signal is generated, the parameter transferred to a next frame is changed from a parameter of the current frame into a parameter of a previous frame for caching. Because of the protection of other modules, the asynchronization of the platform will be repaired in the next frame, and therefore this cross-frame processing manner may guarantee that the system performs emergency processing after an emergency happens, as shown in FIG. 4.

In such a mode, the parameter generated by a burst asynchronous frame is meaningless since the parameter comparison by the two FPGAs cannot be accomplished. Therefore, here, one more level of parameter caching is adopted to guarantee that a meaningful parameter is introduced for processing in a normal frame. Of course, the above embodiment is not restricted to the 8k video image, but may be applicable to all video images that need synchronization.

Figure 5:
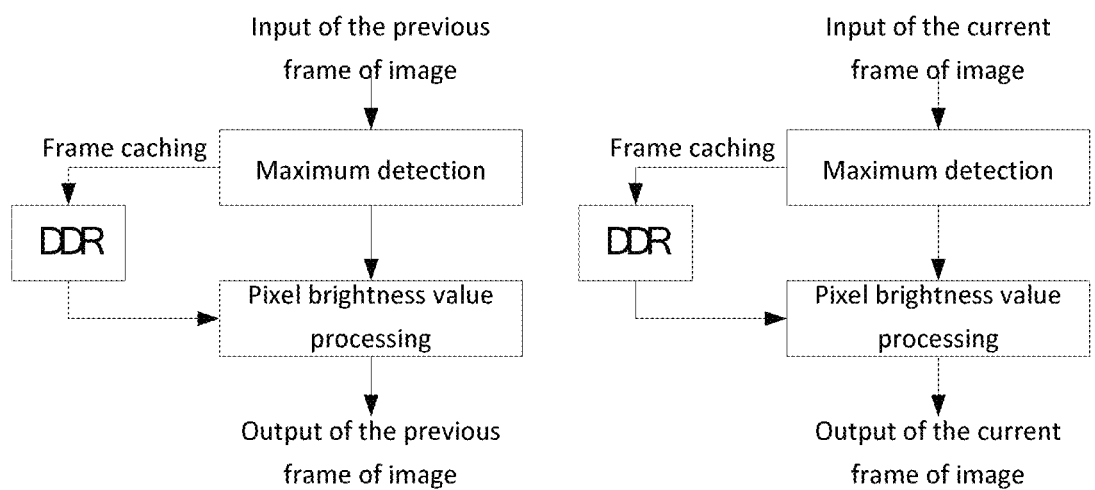
FIG. 5 is a first schematic diagram of video image processing provided by an embodiment of the disclosure.
Figure 6:
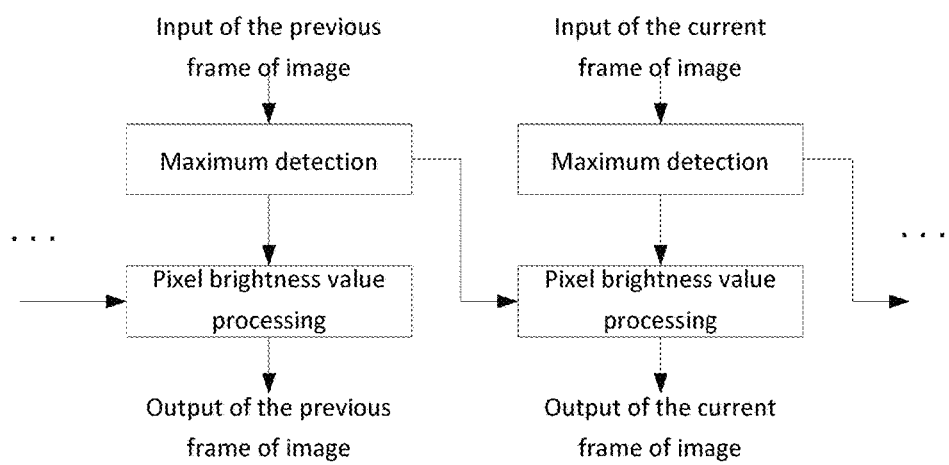
FIG. 6 is a second schematic diagram of video image processing provided by an embodiment of the disclosure.

What is processed by the 8k or 4k product project is video stream data at 30/60 fps. For an FPGA implementation, if the parameter of the current frame is adopted as an operation parameter, additional DDR storage is needed. In order not to introduce an additional off-chip storage resource in the processing, the processor is optimized to a strategy in which the parameter of the previous frame (i.e., the maximum of the brightness values of all input pixels in the previous frame of image) is utilized to replace the parameter of the current frame (i.e., the maximum of the brightness values of all input pixels in the current frame of image), to guarantee real-time streamlined design of the design. FIG. 5 shows an algorithm implementation in which the parameter of the current frame is adopted for image enhancement, which needs to scan the current frame of image first, to evaluate the maximum of the brightness values of all input pixels. Due to the streamlined design of hardware, when pixel processing is performed on this frame of image again, it is needed to utilize an external storage to cache the pixels in advance, and such a processing mode increases additional processing delay. FIG. 6 shows an algorithm implementation in which the parameter of the previous frame is adopted for image enhancement, and in which the processor uses the maximum obtained after scanning of the previous frame for processing. Such an implementation flow avoids additional DDR access delay, and improves the processing capability of the processing module.

The division operation in the contrast enhancement algorithm will produce a floating point result, and in computing the result and subsequent processing using the result, a lot of floating point operations will reduce the implementation efficiency of hardware. Therefore, a fixed point approach may be adopted to obtain the ratio of the brightness value of each input pixel in the current frame of image to the brightness characterization parameter. Thus, the original data is expanded, such that floating point results of its operations are represented in the form of integer. The experimental results show that for 10 bit pixel processing, expansion of 24 bits is needed in the approach, such that floating point results can be represented by approximate integers. After the fixed point processing, the amendment formula of the enhancement algorithm is as follows:

$$p = \left(\frac{2^{24}}{L_{max}} \times S\right) >> (24\text{-}10)$$

wherein p is the brightness value of a pixel after the enhancement, S is the brightness value of the input pixel, and Lmax is the brightness characterization parameter.

By left shifting the dividend by 24 bits (multiplication), the quotient is made to be able to be represented approximately with an integer. After completion of the computation, the result is shifted by 24 bits again to return to the original pixel range, wherein the subtracted 10 bits represent the range of pixel values that are originally multiplied, namely, M+1, and for a 10 k video image, the M value is 1023. Since hardware fixed point is adopted, the division operation that should have been performed on each pixel is also converted to multiplication, which further reduces the processing delay and hardware implementation resources.

Most of the conventional contrast enhancement algorithms adopt the RGB mode for image optimization. However, the three pixel channels of RGB belong to chromaticity information, and therefore, after processing of the three channels, unequal chromaticity amplification will cause that color difference occurs to the final display picture. To improve such a situation, the implementation employs the YUV format for processing an image. Since the chromaticity (UV) channel and the brightness (Y) channel are separated in YUV, the contrast may be improved only by changing the Y (brightness) channel, the chromaticity channel UV is not changed, and the image is enhanced only in the brightness channel, which avoids the problem of color difference in some scenes caused by changing the chromaticity channel. In an actual application, when an inputted original video image is in the RGB format, it may be converted into the YUV format first, and then subsequent enhancement algorithm operations are performed.

Figure 7:
FIG. 7 is an experimental comparison diagram provided by an embodiment of the disclosure.

When the overall brightness of an image is low, a viewer's perception of the picture is blurred. FIG. 7 gives the comparison of a contrast enhanced image with the image which is not enhanced, wherein the left half is the processed image of which the contrast is increased, and the right half is one unchanged. It may be seen that for an image with low brightness, the video image processing method provided by embodiments of the disclosure can enhance the contrast and enhance the display effect.

Figure 8:
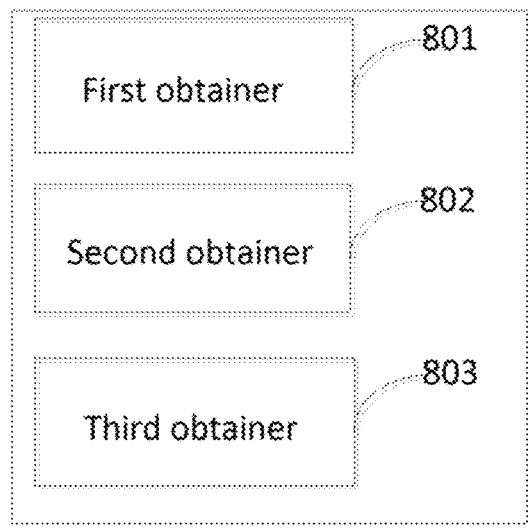
FIG. 8 is a block diagram of a video image processing apparatus according to an embodiment of the disclosure.

Another aspect of the disclosure provides a video image processing apparatus 800. Referring to FIG. 8, the apparatus includes: a first obtainer 801 configured for obtaining a brightness characterization parameter representing image brightness for a current frame of image; a second obtainer 802 configured for obtaining the ratio of the brightness value of each input pixel in the current frame of image to the brightness characterization parameter; and a third obtainer 803 configured for obtaining the product of the ratio and a numerical value (M+1), wherein M is a maximum possible pixel brightness value of the current frame of image, and taking the product as the brightness value of an output pixel of the current frame of image.

According to an embodiment, the first obtainer 801 is further configured to take the maximum of the brightness values of all input pixels in the current frame of image as the brightness characterization parameter.

According to an embodiment, the first obtainer 801 is further configured to take the maximum of the brightness values of all input pixels in a previous frame of image as the brightness characterization parameter.

According to an embodiment, the video image is an 8k video image, that is, the M value is 255, and the first obtainer 801 is further configured to determine the brightness characterization parameter in a way in which when the maximum of the brightness values of all input pixels in the previous frame of image is less than the numerical value 128, the brightness characterization parameter is the difference between the numerical value 255 and the maximum; when the maximum of the brightness values of all input pixels in the previous frame of image is greater than the numerical value 250, the brightness characterization parameter is the difference between the maximum and the numerical value 5; and when the maximum of the brightness values of all input pixels in the previous frame of image is greater than or equal to the numerical value 128 and less than or equal to the numerical value 250, the brightness characterization parameter is the maximum.

According to an embodiment, the first obtainer 801 is further configured to detect whether an asynchronous processing signal is received; and if the asynchronous processing signal is received, the obtaining a brightness characterization parameter for a current frame of image is particularly to obtain a brightness characterization parameter for a previous frame of image as the brightness characterization parameter for the current frame of image.

According to an embodiment, the second obtainer 802 is further configured to adopt a fixed point approach to obtain the ratio of the brightness value of each input pixel in the current frame of image to the brightness characterization parameter.

According to an embodiment, the video image is a YUV format image.

The detailed introduction of the functions of various modules in the video image processing apparatus may be referred to the introduction of various steps in the video image processing method, and will not be repeated here any longer, which may accomplish the same functions as the video image processing method.

Figure 9:
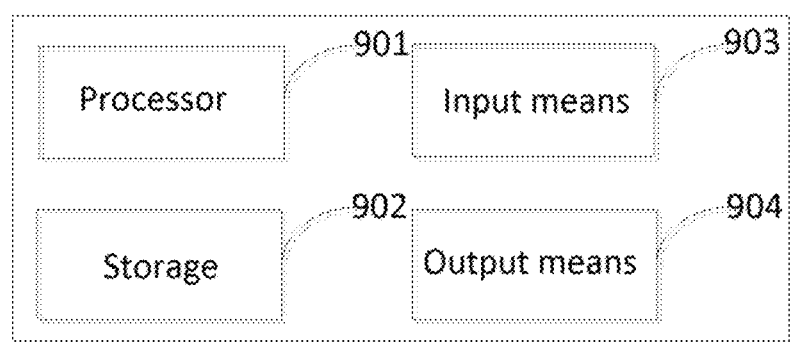
FIG. 9 is a hardware structure diagram of a device implementing the video image processing method according to an embodiment of the disclosure.

Refer to FIG. 9, which is a hardware structure diagram of a device implementing the video image processing method according to an embodiment of the disclosure. The illustrated display device includes at least one processor 901 and a storage 902. In FIG. 9, one processor 901 is taken as an example.

The device implementing the video image processing method may further include an input means 903 and an output means 904.

The processor 901, the storage 902, the input means 903 and the output means 904 may be mutually connected via bus or other means.

As a non-volatile computer readable storage medium, the storage 902 may be used for storing a non-volatile software program, a non-volatile computer executable program and module, for example, a program instruction/module corresponding to the video image processing method in the embodiments of the application. The processor 901 performs various functional applications and data processing of a server by running the non-volatile software program, instruction and module stored in the storage 902, namely, implements the video image processing method of the above method embodiments.

The storage 902 may include a storage program area and a storage data area, wherein the storage program area may store an operating system, an application program required for at least one function, and the storage data area may store data created according to the use of a display device, etc. In addition, the storage 902 may include a high-speed random access memory, or also may include a non-volatile storage, for example, at least one disk storage device, flash device or other non-volatile solid storage devices. In some embodiments, the storage 902 exemplarily includes a storage arranged remotely relative to the processor 901, which may be connected to the display device via a network. Examples of the network include, but not limited to, the internet, intranet, local area network, mobile communication network and a combination thereof.

The input means 903 may receive inputted digit or character information, and generate a key signal input related with the user settings and the functional control of the display device. The output means 904 may include a video presentation device such as a display screen, etc. or an audio presentation means such as a speaker, etc.

The one or more module is stored in the storage 902, and when executed by the one or more processor 901, performs the video image processing method in any of the method embodiments.

The above products may perform the method provided by the embodiments of the application, and have corresponding functional modules performing the method and beneficial effects. The technical details not described in detail in the embodiments may be referred to the method provided by the embodiments of the application.

The electronic devices of the embodiments of the disclosure exist in multiple forms, including, but not limited to, (1) mobile communication devices, of which the characteristics are having mobile communication functions and taking provision of voice and data communication as the main goal, and which include smart mobile phones (e.g., iPhone), multimedia mobile phones, functional mobile phones and low-end mobile phones, etc., and may have functions of video playback and photographing.

(2) ultra mobile PC devices, which belong to the category of PCs, have calculation and processing functions, and generally also have characteristics of mobile internet access, and which include PDA, MID and UMPC devices, etc, for example, iPad, and which may have functions of video playback and photographing.

(3) portable entertainment devices, which may display and play multimedia content, and include audio and video players (e.g., iPod), handheld game machines, cameras, electronic books and smart toys and portable in-vehicle navigation devices.

(4) servers, which are devices providing computing services, of which the composition includes a processor, a hard disk, a memory, a system bus, etc., of which the architecture is similar to that of a general-purpose computer, but for which the requirements for processing power, stability, reliability, security, scalability and manageability, etc. are higher because of the need for providing services of high reliability.

(5) other electronic apparatuses with data processing capabilities.

It should be appreciated by the person having ordinary skills in the art that, the discussion of any of the above embodiments is only exemplary, and is not intended to imply that the scope of the disclosure (including the claims) is limited to these examples, and in the concept of the invention, the above embodiments or the technical features in different embodiments may also be combined, the steps may be realized in any order, and many other changes of the different aspects of the invention as described above exist, which are not provided in detail for simplicity.

In addition, for simplifying description and discussion, and in order not to make the invention difficult to understand, well-known power/ground connections with an integrated circuit (IC) chip and other components may be or may not be shown in the provided drawings. In addition, apparatuses may be shown in the form of block diagram, to avoid making the invention difficult to understand, and this also considers the fact that the implementation details about these block diagram apparatuses highly depend on a platform which will implement the invention (that is, these details should be completely within the understanding of the person having skills in the art). In a case in which particular details have been set forth to describe the exemplary embodiments of the invention, it is evident to the person having skills in the art that the invention may be implemented without these particular details or with these particular details being changed. Therefore, the description should be considered illustrative rather than limiting.

Although the invention has been described in conjunction with the specific embodiments of the invention, many alternatives, modifications and variations of these embodiments will be obvious to the person having ordinary skills in the art according to the foregoing description.

Since by amending the existing Retinex algorithm formula to remove the logarithmic operation, the video image processing method provided by the embodiments of the disclosure simplifies the processing of the inputted video image as obtaining the ratio of each input pixel to the brightness characterization parameter, this simplifies the computational complexity of the Retinex algorithm, increases the processing speed of the video image, and makes real-time processing of the existing video image, especially the 8 K video image possible.

What are described above are just specific embodiments of the disclosure, however, the protection scope of the invention is not limited thereto, and variations or alternatives easily occurring to any artisan familiar with the technical field within the technical scope disclosed by the disclosure should be encompassed within the protection scope of the invention. Therefore, the protection scope of the invention should be subject to the protection scope of the claims.

The invention claimed is:

1. A video image processing method, the video image including multiple frames of image, the method including:
obtaining a brightness characterization parameter representing image brightness for a current frame of image;
obtaining a ratio of a brightness value of each input pixel in the current frame of image to the brightness characterization parameter; and
obtaining a product of the ratio and a numerical value (M+1), wherein M is a maximum possible pixel brightness value of the current frame of image, and taking the product as a brightness value of an output pixel of the current frame of image.

2. The video image processing method as claimed in claim 1, wherein the brightness characterization parameter is maximum of brightness values of all input pixels in the current frame of image.

3. The video image processing method as claimed in claim 1, wherein the brightness characterization parameter is a maximum of brightness values of all input pixels in a previous frame of image.

4. The video image processing method as claimed in claim 1, wherein
in response to a maximum of brightness values of all input pixels in a previous frame of image being less than a numerical value 128, the brightness characterization parameter is determined as difference between a numerical value 255 and the maximum;
in response to the maximum of the brightness values of all input pixels in the previous frame of image being greater than a numerical value 250, the brightness characterization parameter is determined as difference between the maximum and a numerical value 5; and
in response to the maximum of the brightness values of all input pixels in the previous frame of image being greater than or equal to the numerical value 128 and less than or equal to the numerical value 250, the brightness characterization parameter is determined as the maximum;
wherein the M value is 255.

5. The video image processing method as claimed in claim 1, wherein
   in response to a maximum of brightness values of all input pixels in the current frame of image being less than a numerical value 128, the brightness characterization parameter is determined as difference between a numerical value 255 and the maximum;
   in response to the maximum of the brightness values of all input pixels in the current frame of image being greater than a numerical value 250, the brightness characterization parameter is determined as difference between the maximum and a numerical value 5; and
   in response to the maximum of the brightness values of all input pixels in the current frame of image being greater than or equal to the numerical value 128 and less than or equal to the numerical value 250, the brightness characterization parameter is determined as the maximum;
   wherein the M value is 255.

6. The video image processing method as claimed in claim 1, wherein before the obtaining the brightness characterization parameter for the current frame of image, the method further includes
   detecting whether an asynchronous processing signal is received; and
   if the asynchronous processing signal is received, the obtaining the brightness characterization parameter for the current frame of image comprises obtaining the brightness characterization parameter for a previous frame of image.

7. The video image processing method as claimed in claim 1, wherein the obtaining the ratio of the brightness value of each input pixel in the current frame of image to the brightness characterization parameter is particularly to
   adopt a fixed point approach to obtain the ratio of the brightness value of each input pixel in the current frame of image to the brightness characterization parameter.

8. The video image processing method as claimed in claim 1, wherein the video image is a YUV format image.

9. The video image processing method as claimed in claim 1, wherein the M value is selected from a group consisting of 15, 255, and 1023.

10. A display device including:
    a storage configured to store a computer program; and
    a processor configured to execute the computer program to implement the video image processing method as claimed in claim 1.

11. A computer program product including computer executable instructions stored on a non-transitory computer-readable medium, which cause a computing device to implement the method as claimed in claim 1 when executed by the computing device.

12. A video image processing apparatus including:
    a first obtainer configured for obtaining a brightness characterization parameter representing image brightness for a current frame of image;
    a second obtainer configured for obtaining a ratio of a brightness value of each input pixel in the current frame of image to the brightness characterization parameter; and
    a third obtainer configured for obtaining a product of the ratio and a numerical value (M+1), wherein M is a maximum possible pixel brightness value of the current frame of image, and taking the product as a brightness value of an output pixel of the current frame of image.

13. The video image processing apparatus as claimed in claim 12, wherein the first obtainer is further configured to take a maximum of brightness values of all input pixels in the current frame of image as the brightness characterization parameter.

14. The video image processing apparatus as claimed in claim 12, wherein the first obtainer is further configured to take a maximum of brightness values of all input pixels in a previous frame of image as the brightness characterization parameter.

15. The video image processing apparatus as claimed in claim 12, wherein the first obtainer is further configured to determine the brightness characterization parameter in a way in which
    in response to a maximum of brightness values of all input pixels in a previous frame of image being less than a numerical value 128, the brightness characterization parameter is determined as difference between a numerical value 255 and the maximum;
    in response to the maximum of the brightness values of all input pixels in the previous frame of image being greater than a numerical value 250, the brightness characterization parameter is determined as difference between the maximum and a numerical value 5; and
    in response to the maximum of the brightness values of all input pixels in the previous frame of image being greater than or equal to the numerical value 128 and less than or equal to the numerical value 250, the brightness characterization parameter is determined as the maximum;
    wherein the M value is 255.

16. The video image processing apparatus as claimed in claim 12, wherein the first obtainer is further configured to determine the brightness characterization parameter in a way in which
    in response to a maximum of brightness values of all input pixels in the current frame of image being less than a numerical value 128, the brightness characterization parameter is determined as difference between numerical value 255 and the maximum;
    in response to the maximum of the brightness values of all input pixels in the current frame of image being greater than a numerical value 250, the brightness characterization parameter is determined as difference between the maximum and a numerical value 5; and
    in response to the maximum of the brightness values of all input pixels in the current frame of image being greater than or equal to the numerical value 128 and less than or equal to the numerical value 250, the brightness characterization parameter is determined as the maximum;
    wherein the M value is 255.

17. The video image processing apparatus as claimed in claim 12, wherein the first obtainer is further configured to
    detect whether an asynchronous processing signal is received; and
    if the asynchronous processing signal is received, the obtaining the brightness characterization parameter for the current frame of image comprises obtaining the brightness characterization parameter for a previous frame of image.

18. The video image processing apparatus as claimed in claim 12, wherein the second obtainer is further configured to
    adopt a fixed point approach to obtain the ratio of the brightness value of each input pixel in the current frame of image to the brightness characterization parameter.

19. The video image processing apparatus as claimed in claim 12, wherein the video image is a YUV format image.

20. The video image processing apparatus as claimed in claim 12, wherein the M value is selected from a group consisting of 15, 255, and 1023.

* * * * *